United States Patent [19]

Shipp, Jr. et al.

[11] Patent Number: 4,714,647

[45] Date of Patent: Dec. 22, 1987

[54] MELT-BLOWN MATERIAL WITH DEPTH FIBER SIZE GRADIENT

[75] Inventors: Peter W. Shipp, Jr., Woodstock; Clifford M. Vogt, Roswell, both of Ga.

[73] Assignee: Kimberly-Clark Corporation, Neenah, Wis.

[21] Appl. No.: 858,995

[22] Filed: May 2, 1986

[51] Int. Cl.⁴ .................................................. B32B 7/02
[52] U.S. Cl. ...................................... 428/212; 55/487; 156/167; 428/284; 428/286; 428/298; 428/296; 428/903
[58] Field of Search .............. 428/280, 283, 284, 286, 428/288, 298, 296, 903, 212, 221; 156/167; 428/397; 55/487

[56] References Cited

U.S. PATENT DOCUMENTS

| | | | |
|---|---|---|---|
| 2,988,469 | 6/1961 | Watson | 154/101 |
| 3,073,735 | 1/1963 | Till et al. | 156/167 |
| 3,231,639 | 1/1966 | Mabru | 264/12 |
| 3,825,380 | 7/1974 | Harding et al. | 425/72 |
| 3,849,241 | 11/1974 | Buntin et al. | 161/169 |
| 3,888,610 | 6/1975 | Brackman et al. | 425/72 |
| 4,011,067 | 3/1977 | Carey, Jr. | 55/354 |
| 4,018,646 | 4/1977 | Ruffo et al. | 162/146 |
| 4,032,688 | 6/1977 | Pall | 428/36 |
| 4,041,203 | 8/1977 | Brock et al. | 428/903 |
| 4,116,738 | 9/1978 | Pall | 156/167 |
| 4,180,611 | 12/1979 | Schultheiss | 428/903 |
| 4,181,513 | 1/1980 | Fukuda et al. | 55/316 |
| 4,211,661 | 7/1980 | Perry | 210/491 |
| 4,215,682 | 8/1980 | Kubik et al. | 128/205.29 |
| 4,375,718 | 3/1983 | Wadsworth et al. | 29/592 |
| 4,431,545 | 2/1984 | Pall et al. | 210/641 |
| 4,526,733 | 7/1985 | Lau | 264/12 |
| 4,622,259 | 11/1986 | McAmesh et al. | 428/903 |

Primary Examiner—James J. Bell
Attorney, Agent, or Firm—William D. Herrick

[57] ABSTRACT

A filter medium is formed by sequentially depositing layers of melt-blown thermoplastic fibers, having the same composition but different sizes, onto a collector. The resulting laminate web has a fiber size gradient across its depth so that the large particulate can be trapped across the filter's depth without prematurely plugging the fine fiber, high efficiency layers.

8 Claims, 6 Drawing Figures

MELT-BLOWN MATERIAL WITH DEPTH FIBER SIZE GRADIENT

BACKGROUND OF THE INVENTION

This invention relates generally to melt-blown materials, and more particularly concerns a melt-blown material which has a fiber size gradient across its depth or Z direction.

Materials manufactured by melt-blowing are well known and widely used in a variety of ways in commercial, industrial, and household goods. The melt-blowing process is used to form webs of thermoplastic microfibers and involves heating a polymer resin to form a melt, extruding the melt through a die orifice in a die head, directing a stream of heated fluid, usually air, toward the melt exiting the die orifice to form filaments or fibers that are discontinuous and attenuated, and collecting the fibers on a drum or foraminous belt to form a web. Because the fibers are still tacky when they are collected, they bond together to form an integrated web.

The melt-blown process is well known and is described in various patents and publications, including NRL Report 4364, "Manufacture of Super-Fine Organic Fibers" by V. A. Wendt, E. L. Boon, and C. D. Fluharty; NRL Report 5265, "An improved Device for the Formation of Super-Fine Thermoplastic Fibers" by K. D. Lawrence, R. T. Lukas, and J. A. Young; and U.S. Pat. No. 3,849,241 issued Nov. 19, 1974, to Buntin, et al.

Melt-blown webs of microfibers are useful as filter media, absorbent materials, moisture barriers, insulators, wipes, and the like. Particularly, melt-blown materials appear to have a potential for use as filter media for HEPA and pre-HEPA filters.

A HEPA filter has a filtration efficiency of at least 99.97% to 0.3 micron particles. The efficiency of HEPA filters is measured in accordance with test procedures described in Military Standard 282, Test Method 102.1, using dioctylphthalate particles that average 0.3 micron at a face velocity of 10.4 to 10.5 feet per minute. The efficiency of the filter refers to the percentage of particles that are filtered out of the air stream by the HEPA filter. Filters are classified as HEPA only if they achieve the requisite 99.97% filtration efficiency. Filters having efficiencies from about 90 to 99.97% are referred to as pre-HEPA filters.

HEPA and pre-HEPA filters are used to filter air in clean rooms where integrated circuits and precision equipment are manufactured. HEPA and pre-HEPA filters are also used in filtering air for operating rooms to filter out bacteria and other contaminants which may be present in the air and harmful to patients.

Not only must HEPA and pre-HEPA filters provide the requisite filter efficiency, it is likewise important that the pressure drop across the filter be maintained as low as possible for a given filter efficiency. If the pressure drop becomes excessive across the HEPA or pre-HEPA filters, larger more powerful fans will be required to compensate for the excess pressure drop with the resulting increase in power and noise. Therefore, it is important that HEPA and pre-HEPA filters maintain the lowest possible pressure drop at a given efficiency rating over the useful life of the filter medium.

Typically HEPA and pre-HEPA filter media are produced from glass filaments which filaments range in size from 0.3 to 2.0 microns in diameters. Glass filter media are formed in sheets by a wet (papermaking) process. In order for glass fiber HEPA and pre-HEPA filters to perform at the requisite efficiencies, the filament sizes must be small to yield pore sizes within the filter that are sufficiently small to assure that the 0.3 micron particles do not pass through the filter media. Such filter media are usually formed as a single sheet with uniform distribution of glass fibers across the depth (Z direction).

Melt-blown filter media which approach pre-HEPA filter efficiency can be made by lowering the throughput of the melt-blown extruder from a conventional rate of about 4 to 5 pounds per inch of die width per hour (PIH) of polypropylene to about 1 PIH and increasing the amount of fluid used in attenuating and breaking up the polymer stream from a conventional rate of about 100 to 150 standard cubic feet per minute (SCFM) to about 250 to 325 SCFM. (Standard cubic feet per minute relates to a 20-inch wide die head. Therefore flow rates for cubic feet per minute per inch of die head width are calculated by dividing the SCFM value by 20.) The resulting melt-blown fibers have an average size of about 5 to 6 microns in diameters (ranging from about 0.5 microns to about 10 microns), about the same as regular melt-blown fibers, but the overall melt-blown web is more uniform than a conventional melt-blown web. While a conventional melt-blown web has a filter efficiency well below 70% at a pressure drop of about 0.1 inches of water, the improved melt-blown web, having similar sized fibers, has efficiencies from about 95% to about 99.26% at pressure drops from about 0.25 to about 0.36 inches of water.

Such a melt-blown filter medium can be further improved by cold calendering the melt-blown material at a pressure of from about 100 pounds per square inch to about 300 pounds per square inch. The resulting cold calendered melt-blown material when used as a filter medium has efficiencies from about 97.0% to about 99.57% with pressure drops from about 0.32 to about 0.65 inches of water.

Where a HEPA or pre-HEPA filter, comprising a single sheet of 0.3 to 2.0 micron glass fibers or of cold calendered, 0.5 to 10 micron melt-blown polypropylene fibers, is used to filter air containing a random distribution of particles ranging in size from very small, in the order of 0.3 microns, up to particles of much greater size, the single sheet glass fiber or melt-blown polypropylene fiber HEPA or pre-HEPA filter medium will tend to load up very rapidly with particulate matter as the large particles are trapped on the upstream surface of the filter. As a result, the upstream side of the filter rapidly becomes blocked with particulate matter, thereby increasing dramatically the pressure drop across the filter and shortening the filter's useful life.

In order to overcome such premature plugging and replacement, a depth filter medium may be used in place of a single sheet filter medium having uniform fiber distribution in its Z direction. Depth filters have layers of fibers which provide different filter efficiencies in the Z direction. The layers may be discrete laminated plies, they may have different densities, or they may result from mixing different fibers.

In the latter category, Till, et al, U.S. Pat. No. 3,073,735 discloses a process for making a depth filter material. The process includes a first fiber forming station for depositing fine plastic fibers having a diameter of from 0.5 microns to about 10 microns onto a collecting belt by means of a spray tube and air nozzle arrangement. At a second station, a fan blows staple length rayon fibers through a duct spaced from the spray tube and air nozzle in order to deposit rayon fibers having a diameter of 10 microns and greater on top of the fine plastic fibers deposited by the spray tube and air nozzle. The two fiber-depositing stations produce cone-shaped fiber patterns which overlap, thus producing a mixture of fibers in the center of the resulting web. The web has a gradient of fiber sizes from small thermoplastic fibers on one side to large staple fibers on the other side, and is said to function as a depth filter.

Pall U.S. Pat. No. 4,032,688 discloses a method for forming a melt-blown filter medium on a rotating mandrel. By tilting the die head with regard to the axis of the mandrel, the resulting web has a greater density of fibers near one surface and a lower density of fibers near the opposite surface. The fibers themselves, however, appear to be of uniform average diameter across the depth of the filter media.

As previously stated, depth filter media are also produced by laminating webs of material having different filter efficiencies or characteristics. For example, Cary U.S. Pat. No. 4,011,067 discloses a filter medium produced from either melt-blown or solution-blown microfibers. The filter medium is a plied medium having a base porous web, an intermediate layer of microfibers, and a top porous web. The outside layers contribute only a minor portion, normally less than 20% of the pressure drop, and are typically non-woven fibrous webs such as polyethylene terephthalate. The intermediate layer of microfibers is of sufficient thickness to produce a HEPA filter.

Wadsworth et al, U.S. Pat. No. 4,375,718 discloses a process for manufacturing an electrostatically charged filter medium. The fibers in the filter medium may be polypropylene and may be formed by melt-blowing techniques. The fiber sizes for the melt-blown fibers are disclosed to be from 0.3 to 5 microns in diameter. The melt-blown filter medium is then plied on either side with a contact web of non-woven cellulosic fibers such as cotton, rayon, wood pulp, or hemp, or mixtures of those fibers. The non-woven contact web has specific electrical properties which will accept an electrical charge.

SUMMARY OF THE INVENTION

It is an object of the present invention, therefore, to provide a process for making a unitary melt-blown thermoplastic web for use as a depth filter medium which has a gradient of fiber sizes across the depth of the filter medium.

The foregoing objective is achieved by a one-step, melt-blown process carried out on a forming line which has multiple die heads spaced along a collecting belt. By varying the process parameters for each die head, to produce microfibers of varying average diameter, a web may be built up of subsequent layers, each having a predetermined and generally different average fiber size. As a result, the first (upstream) layer of the web may have large fiber sizes (extra coarse) and resulting large pore sizes for entrapping large particulate, intermediate layers may have smaller fiber sizes (coarse and medium) for trapping intermediate size particulate, and a final (downstream) layer or layers may have small fiber sizes (fine) and pore sizes for entrapment of the smallest particulate that passes easily through the layers of larger pore size. As a result, the large and intermediate particulate is trapped in the first and intermediate layers through the depth of the filter, thereby avoiding premature plugging of the upstream surface of the filter medium and the fine final layer.

More particularly the process of the present invention produces a fine layer or layers at a through-put of polypropylene melt of less than 1 pound per hour per inch of die head width (PIH) and at an air flow of between 250 and 325 standard cubic feet per minute for a 20 inch wide die head (SCFM); an intermediate layer or layers at a through-put of greater than 1 PIH and at an air flow of less than 250 SCFM; and a coarse layer or layers at a through-put of greater than that of the intermediate layer or layers and at an air flow of less than 250 SCFM.

Because the filter medium of the present invention is formed of thermoplastic fibers of the same composition and on the same forming line, bonding between the fibers in the various layers is assured, and the filter medium has consistent integrity throughout to assure predictable filtration and to avoid delamination. Also cold calendering of the web after forming enhances filtration efficiency.

Other objects and advantages of the invention will become apparent upon reading the following detailed description and upon reference to the drawings.

DETAILED DESCRIPTION OF THE INVENTION

While the invention will be described in connection with a preferred embodiment and procedure, it will be understood that we do not intend to limit the invention to that embodiment or procedure. On the contrary, we intend to cover all alternatives, modifications, and equivalents as may be included within the spirit and scope of the invention as defined by the appended claims.

Figure 1:
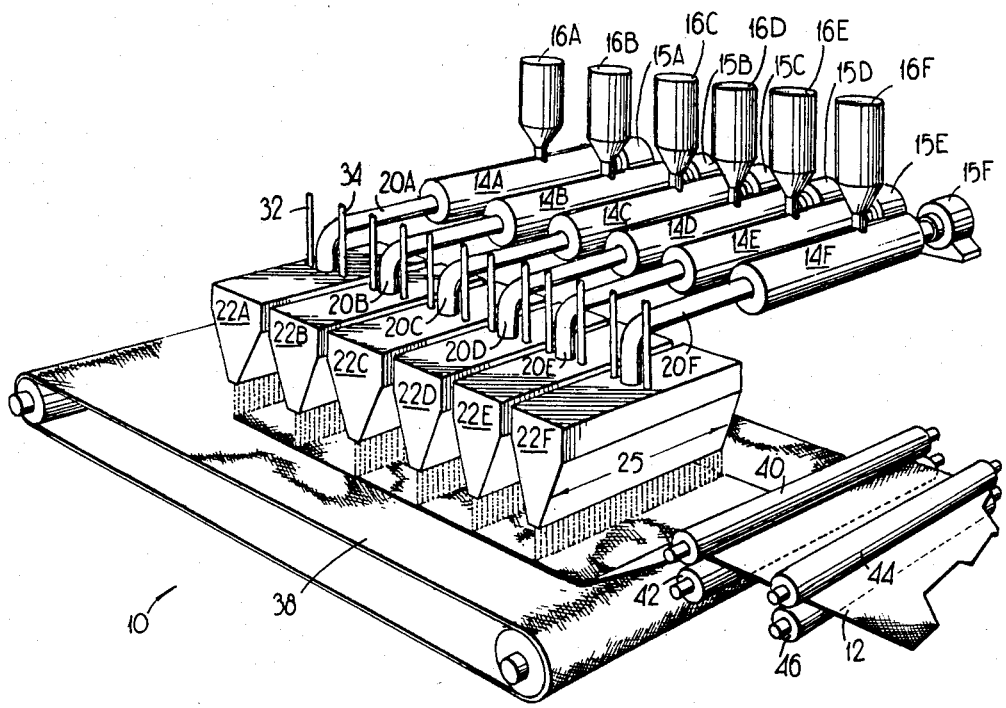
FIG. 1 is a schematic diagram showing machinery for producing the melt-blown material of the present invention.

Turning to FIG. 1, there is shown web forming machinery 10 for forming a melt-blown web 12 having a fiber size gradient across its depth. The machinery 10 includes six identical extruders 14A–F with corresponding hoppers 16A–F for receiving thermoplastic resin pellets. The extruders 14A–F include internal screw conveyors which are driven by drive motors 15A–F. The extruders 14A–F are heated along their lengths to the melting temperature of the thermoplastic resin pellets to form a melt. The screw conveyors, driven by motors 15A–F, force the thermoplastic material through the extruders into attached delivery pipes 20A-F which are connected to die heads 22A-F, each having a die width 25.

Figure 2:
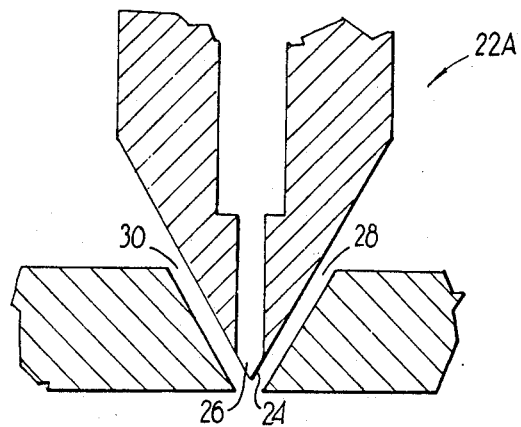
FIG. 2 is a cross-section diagram of a die head used in connection with carrying out the melt-blown process of the present invention.

Die head 22A, for example, is shown in cross-section in FIG. 2 and comprises a die tip 24 which has a die opening or orifice 26 therein. Hot fluid, usually air, is supplied to the die tip via pipes 32 and 34 (FIG. 1) which terminate in channels 28 and 30 adjacent outlet 26 of the die tip.

As the thermoplastic polymer exits the die tip at opening 26 for each die head, the high pressure air attenuates and breaks up the polymer stream to form fibers at each die head which fibers are deposited in layers on a moving foraminous belt 38 to form the layered web 12. A vacuum is drawn behind the foraminous belt 38 to draw the fibers onto the belt 38 during the process of melt-blowing. Separate vacuum chambers behind the foraminous belt may be provided for each die head in order to provide the appropriate vacuum pressure for each die head. Once the fiber layers have been deposited on the moving belt 38 by the multiple die heads 22A-F, the web 12 is drawn from the belt 38 by withdrawal rolls 40 and 42. Ambient temperature calendering rolls 44 and 46 engage the web 12 after the withdrawal rolls to calender the web and thereby enhance the filtering efficiency of the layered web 12 as a filter medium.

The foregoing description of the melt-blowing machinery 10 is in general conventional and well-known in the art. The characteristics of the melt-blown web 12 can be adjusted by manipulation of the various process parameters used for each extruder and die head in carrying out the melt-blown process on the melt-blowing machinery 10. The following parameters can be adjusted and varied for each extruder and die head in order to change the characteristics of the resulting melt-blown fiber layer:

1. Type of polymer,
2. Polymer through-put (pounds per inch of die width per hour—PIH),
3. Polymer melt temperature (°F.),
4. Air temperature (°F.),
5. Air flow (standard cubic feet per minute—SCFM—calibrated for a 20-inch wide die head),
6. Distance between die tip and forming belt (inches).
7. Vacuum under forming belt (inches of water).

In addition the whole process can be varied by adjusting calendering pressure (tons or pounds per square inch).

In order to form the depth filter medium of the present invention, die heads 22A-C deposit three layers of fine fibers, one on top of the other, onto the foraminous belt. Several layers of fine fibers are usually required to achieve high filtration efficiency because of the through-put limitations inherent in making the fine fiber layers. Die head 22D deposits a layer of medium fibers on top of the fine fibers. Die head 22E deposits a layer of coarse fibers on top of the medium fiber layer of the web 12. Die head 22F deposits a layer of extra coarse fibers on top of the layer of coarse fibers of web 12. As a result, the composite depth filter medium is built up layer by layer progressing from fine fibers on one side of the web 12 to extra coarse fibers on the opposite side of web 12. The resulting layered web 12 when used as a filter medium therefore provides a depth filter medium having a gradient of fiber sizes through its depth or Z direction.

The fine layers on the depth filter provide the ultimate filter efficiency for the depth filter so that it can achieve the necessary high efficiencies required for HEPA or pre-HEPA filters. Moreover calendering the web 12 between ambient temperature rolls 44 and 46 and pressures between 100 and 300 psi tends to increase filter efficiency by compacting the web in the Z direction and thereby closing up the observable surface pores of the fine layers. The closing of the surface pores is apparently indicative of a reduction in pore size throughout the fine filter layers.

When the web 12 is used as a filter medium, the fine fiber side of the web 12 is used as the downstream side of the filter and the extra coarse fiber side of the web 12 is used as the upstream side of the filter medium. Large particulate is trapped by the extra coarse and coarse layers of the depth filter so that that particulate does not migrate to the fine layers and prematurely plug and block the fine filter layers. Likewise, medium particulate is trapped in the medium layer so that it cannot migrate to the fine layers and prematurely plug the fine layers.

A depth filter medium having two layers of fine fibers, and a layer each of medium, coarse, and extra coarse fibers was prepared using five of the six die heads shown in FIG. 1 and in accordance with the following process parameters:

EXAMPLE 1

| | Fine | Medium | Coarse | Extra Coarse | Composite |
|---|---|---|---|---|---|
| Die head | 22B-C | 22D | 22E | 22F | |
| Polymer[1] | 3145 | 3145 | 3145 | 3145 | |
| Basis Weight (approx. Oz./yd.[2]) | 1.04[2] | 0.66 | 0.71 | 1.09 | 3.5 |
| Through-put (PIH-for each die head) | 0.95 | 1.20 | 1.30 | 2.0 | |
| Air Temp.(°F.) | 630 | 630 | 630 | 630 | |
| Melt Temp.(°F.) | 610 | 610 | 610 | 566 | |
| Air Flow (SCFM)[3] | 150 | 150 | 150 | 150 | |
| Calendering (Tons)[4] | — | — | — | — | 10 |
| Underwire Exhaust (inch H$_2$O) | 15 | 15 | 15 | 13.5 | |
| Forming Distance (inches) | 11 | 11 | 11 | 11 | |
| Average Fiber Size (um) | 2.5 | 5.6 | 8.1 | 26.2 | |
| DOP Efficiency (%) | | | | | 53 |

[1]Polymer 3145 is a polypropylene resin manufactured by Exxon of Des Plaines, Illinois.
[2]1.04 oz./yd.$^2$ is the combined basis weight of both fine layers.
[3]Air flow is calibrated for a 20-inch wide die head and can be alternatively expressed as cubic feet per minute per inch of die head width by dividing the SCFM value by 20 inches.
[4]The calendering was carried out on a 10-inch by 10-inch sample on a platen press. The calendering pressure of 10 tons is therefore equal to (10 tons × 2000 lbs/ton)/100 in.$^2$ = 200 lbs/in.$^2$ (psi).

The efficiency of the composite web as indicated in Example 1 is 53%. The efficiency is essentially equal to the efficiency of the two fine layers combined of the composite laminate web. In order to increase the efficiency of the composite laminate to or near the HEPA or pre-HEPA range, it is necessary to increase the basis weight of the combined fine layers by increasing the number of die heads producing fine fibers ranging in size from 0.3 to 5.0 microns. If, for example, the total basis weight of the fine fiber layers combined is raised from 1.04 to 2.0 oz/yd² by adding additional die heads making fine fibers, the efficiency of the filter would increase to 71%. Further increases in the basis weight coupled with additional calendering pressure would be expected to increase the efficiency of the fine fiber layers to even higher percentage values. Increasing the air flow to between 250 and 325 SCFM would increase the efficiency of the fine layers. Also other polymers such as polypropylene resin PC973 manufactured by Himont U.S.A., Inc. of Wilmington, Del. may produce webs having higher efficiencies.

Although Example 1 illustrates a composite web in which the fiber size gradient decreases (upstream to downstream) across the full depth of the web, the present invention also contemplates composite webs in which the fiber size gradient may increase and decrease across the full depth of the composite web. For example, the present invention contemplates a composite web having layers with fiber sizes (upstream to downstream), of coarse, medium, fine, medium, and coarse fibers. The last two downstream layers (medium and coarse) might be added to protect the fine layer during handling or to provide a filter medium that can be installed without regard to upstream or downstream direction.

Figure 3:
FIG. 3 is a microphotograph (500x) of the fibers of a fine layer of the filter medium of the present invention.
Figure 4:
FIG. 4 is a microphotograph (500x) of the fibers of a medium layer of the filter medium of the present invention.
Figure 5:
FIG. 5 is a microphotograph (500x) of the fibers of a coarse layer of the filter medium of the present invention.
Figure 6:
FIG. 6 is a microphotograph (500x) of the fibers of an extra coarse layer of the filter medium of the present invention.

Turning to FIG. 3, there is shown a microphotograph magnified 500 times of the fine fiber layer of Example 1. Such a layer has fibers ranging in size from 0.3 to 5.0 microns and as indicated in Example 1, the average size is 2.5 microns. Likewise, FIGS. 4, 5, and 6 are microphotographs magnified 500 times of the medium, coarse, and extra coarse fiber layers of Example 1. The microphotographs give a qualitative illustration of the nature of the fiber size gradient across the depth of the composite filter medium.

We claim:

1. A process for forming a composite web of melt-blown thermoplastic fibers, wherein the web has a fiber size gradient across its depth, the process comprising sequentially depositing and interbonding a number of layers of melt-blown thermoplastic fibers one on top of the other onto a collector wherein the fibers in adjacent layers are of the same fiber composition but of different fiber size.

2. The process of claim 1, wherein the web is cold calendered at pressures between 100 and 300 psi.

3. The process of claim 2, wherein the layers comprise at least one fine layer produced by depositing polypropylene fibers from a fine fiber die head at a through-put of polypropylene melt of less than 1 pound per hour per inch of die head width and at a fine fiber air flow of between 250 and 325 standard cubic feet per minute and at least one intermediate layer by depositing polypropylene fibers from an intermediate fiber die head at a through-put of polypropylene melt of greater than 1 pound per hour per inch of die head width and at an intermediate fiber air flow of less than 250 standard cubic feet per minute.

4. The process of claim 3, wherein the layers additionally comprise at least one coarse layer produced by depositing polypropylene fibers from a coarse fiber die head at a through-put of polypropylene melt of greater than that for the intermediate die head and at a coarse fiber air flow of less than 250 standard cubic feet per minute.

5. A filter medium comprising a composite web of melt-blown thermoplastic fibers, the web having a fiber size gradient across its depth, wherein the gradient results from sequentially depositing and interbonding a number of layers of melt-blown thermoplastic fibers having the same composition but different sizes onto a collector.

6. The filter medium of claim 5, wherein the web is cold calendered at pressures between 100 and 300 psi.

7. The filter medium of claim 6, wherein the layers comprise at least one fine layer produced by depositing polypropylene fibers from a fine fiber die head at a through-put of polypropylene melt of less than 1 pound per hour per inch of die head width and at a fine fiber air flow of between 250 and 325 standard cubic feet per minute and at least one intermediate layer by depositing polypropylene fibers from an intermediate fiber die head at a through-put of polypropylene melt of greater than 1 pound per hour per inch of die head width and at an intermediate fiber air flow of less than 250 standard cubic feet per minute.

8. The filter medium of claim 7, wherein the layers additionally comprise at least one coarse layer produced by depositing polypropylene fibers from a coarse fiber die head at a through-put of polypropylene melt of greater than that for the intermediate die head and at a coarse fiber air flow of less than 250 standard cubic feet per minute.

* * * * *